United States Patent
Kämmerer

(10) Patent No.: US 8,424,969 B2
(45) Date of Patent: Apr. 23, 2013

(54) VEHICLE SEAT, IN PARTICULAR MOTOR VEHICLE SEAT

(75) Inventor: Joachim Kämmerer, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 385 days.

(21) Appl. No.: 12/571,633

(22) Filed: Oct. 1, 2009

(65) Prior Publication Data
US 2010/0084903 A1    Apr. 8, 2010

(30) Foreign Application Priority Data
Oct. 4, 2008 (DE) .......................... 10 2008 050 468

(51) Int. Cl.
*B60N 2/02* (2006.01)

(52) U.S. Cl.
USPC ..... 297/329; 297/325; 297/378.1; 297/378.12

(58) Field of Classification Search .................. 297/325, 297/329, 340, 378.1, 378.12
See application file for complete search history.

(56) References Cited

U.S. PATENT DOCUMENTS

| | | | |
|---|---|---|---|
| 5,393,121 A * | 2/1995 | Reuss et al. ................... | 297/329 |
| 5,482,349 A | 1/1996 | Richter et al. | |
| 5,531,503 A * | 7/1996 | Hughes ......................... | 297/341 |
| 6,079,763 A | 6/2000 | Clemente | |
| 6,520,581 B1 * | 2/2003 | Tame ............................ | 297/336 |
| 6,655,738 B2 | 12/2003 | Kämmerer | |
| 6,799,806 B2 | 10/2004 | Eppert et al. | |
| 6,964,452 B2 * | 11/2005 | Kämmerer ..................... | 297/331 |
| 7,040,684 B2 * | 5/2006 | Tame et al. ................. | 296/65.09 |
| 8,066,326 B2 * | 11/2011 | Hurst et al. .................... | 297/321 |
| 2006/0033373 A1 * | 2/2006 | Kämmerer ................. | 297/378.1 |

FOREIGN PATENT DOCUMENTS

| | | |
|---|---|---|
| DE | WO 00/44582 | 8/2000 |
| DE | WO 02/22391 | 3/2002 |
| DE | 102006007139 | 8/2007 |

* cited by examiner

*Primary Examiner* — David Dunn
*Assistant Examiner* — Philip Gabler
(74) *Attorney, Agent, or Firm* — McGlew and Tuttle, P.C.

(57) ABSTRACT

In a vehicle seat (1), in particular a motor vehicle seat, vehicle seat, in particular motor vehicle seat, which may be transferred from at least one position of use suitable for conveying passengers into at least one pivoted-forward position of non-use, comprising a base (9), at least one rocker (13) which is linked at least indirectly to the base (9), in particular to a front foot (11) attached to the base (9), a seat cushion (3) which is linked to the rocker (13), at least one link (27, 29) which is linked at least indirectly to the base (9), in particular to the front foot (11) attached to the base (9), at least one rear foot (21) which is linked to the link (27, 29) and is releasably locked to the base (9), and a backrest (5) which is pivotably linked to the rear foot (21) about a backrest pivot axis (33), the seat cushion (3) is linked by means of an articulated joint (35) directly to the backrest (5).

19 Claims, 1 Drawing Sheet

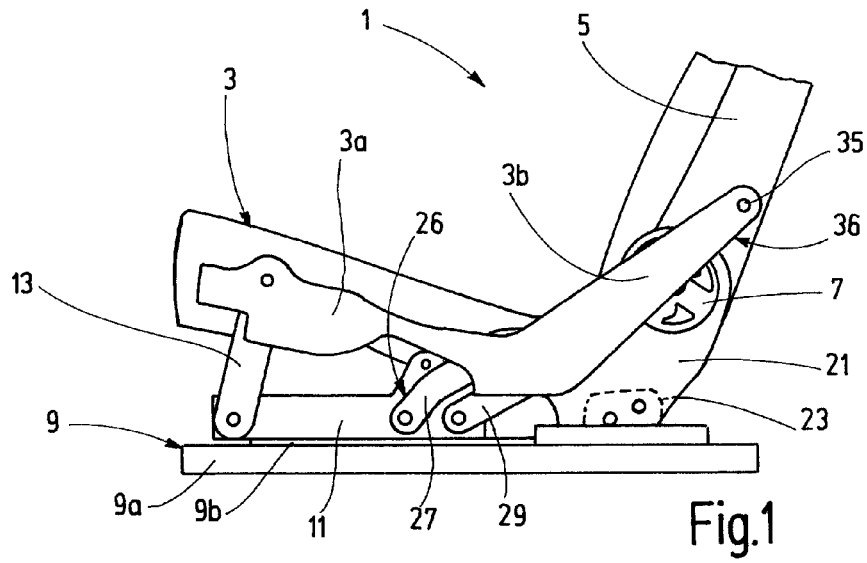
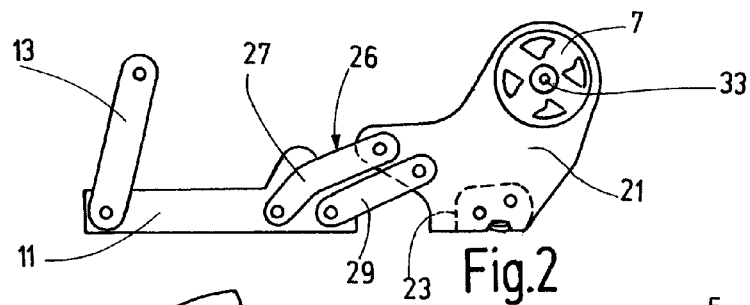
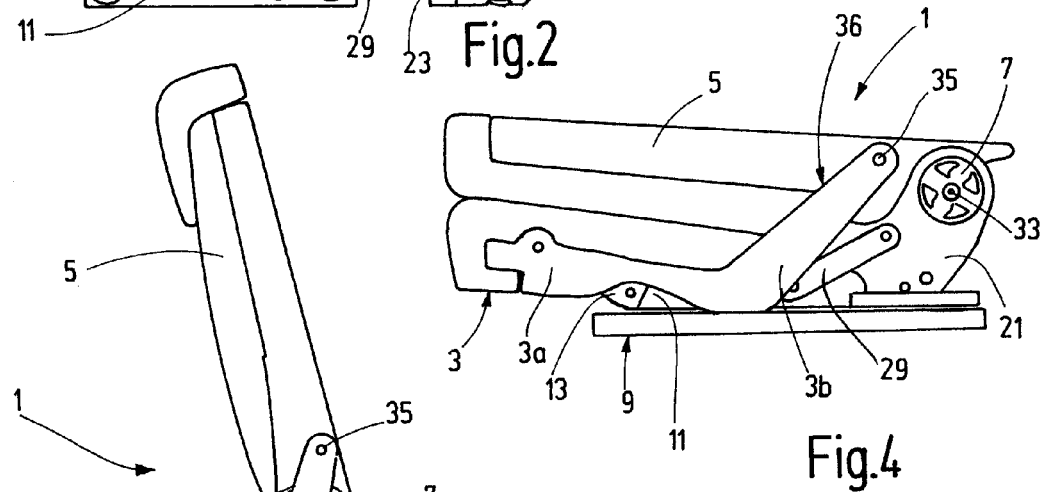
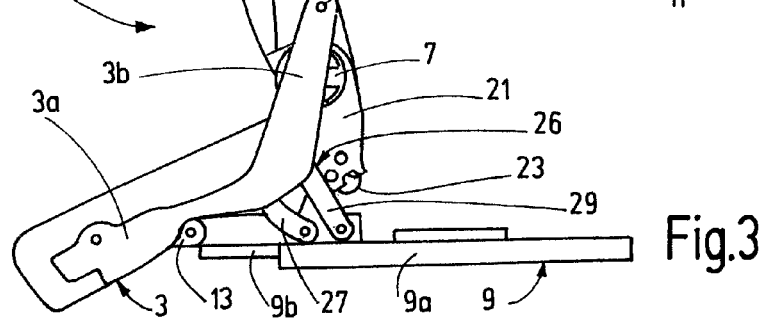

ously bonded. Preferably, however, the locking pin is a component of the vehicle structure, for example part of a cross member.

VEHICLE SEAT, IN PARTICULAR MOTOR VEHICLE SEAT

CROSS REFERENCE TO RELATED APPLICATIONS

This application claims the benefit of priority under 35 U.S.C. §119 of German Patent Application filed Oct. 4, 2008, the entire contents of which are incorporated herein by reference.

FIELD OF THE INVENTION

The invention relates to a vehicle seat, in particular a motor vehicle seat, which may be transferred from at least one position of use suitable for conveying passengers into at least one pivoted-forward position of non-use.

BACKGROUND OF THE INVENTION

The second and/or third row of seats of multi-purpose vehicles (MPV), such as for example vans or large-capacity passenger vehicles, are generally designed such that the interior may be variably adjusted for transporting passengers or goods. For example, a vehicle seat of the aforementioned type is known from DE 10 2006 007 139 A1 which may be transferred from a position of use into a position suitable for boarding or into a folded-down flat-floor position for increasing the loading space. In this connection, a rocker is provided between the seat cushion and the rear foot and a connecting rod is provided between the rocker and the backrest.

SUMMARY OF THE INVENTION

The object of the invention is to provide an alternative to the vehicle seat of the aforementioned type.

According to the invention, a vehicle seat is provided which may be transferred from at least one position of use suitable for conveying passengers into at least one pivoted-forward position of non-use. The vehicle seat comprises a base, a front foot attached to the base, at least one rocker linked to the front foot and a seat cushion linked to the rocker. A link is provided linked to the front foot and a rear foot is linked to the link and is releasably locked to the base. A backrest is pivotably linked to the rear foot about a backrest pivot axis. An articulated joint is provided and the seat cushion is linked directly to the backrest by the articulated joint.

As the seat cushion is articulated directly to the backrest by means of the articulated joint, fewer components are required and the kinematics are simplified in contrast to the prior art. This reduces the production costs. More specifically, with a less mobile seat cushion the vehicle seat requires more constructional space in the boarding position, but in embodiments with seat rails this may be partially compensated by the use of the seat rails for sliding the seat when transferring into the boarding position. It is intended to be understood by the "direct" linking of one component to a further component that, instead of mobile gear elements being provided therebetween which, with a plurality of articulated joints, produce an articulated connection with a plurality of axes, only one single-axis articulated connection exists and, if need be, intermediate parts, for example adapters, which are fixedly connected to just one of the two components, are provided therebetween. In the preferred embodiment of the vehicle seat with two—more or less—mirror-symmetrical vehicle seat sides, the vehicle seat comprises on both sides, i.e. on each vehicle seat side, just one articulated joint between the seat cushion and backrest, the axes of the two articulated joints being aligned with one another.

The gear elements provided preferably form components of four bar linkages, which preferably define a sequence in the movements. Thus, a transition from the position of use into a flat-floor position as a position of non-use is represented as simply folding down the four bar linkage, in which folding down the backrest leads to a lowering of the seat cushion. In order to fix one of the four bar linkages in the position of use, a locking device is sufficient between two gear elements of the four bar linkage, for example a lock or a fitting provided for an inclination adjustment.

As the vehicle seat may be transferred from the position of use into a boarding position, versatile use is made possible in different rows of seats, in particular also in a second row of seats adjacent to a vehicle door. So that in the boarding position the dimensions of the folded-up vehicle seat in the longitudinal direction of the vehicle are as small as possible, the rear foot pivots to the front and, due to the articulated connection to the base and preferably with a front foot configured separately from the base, also upward. In this connection, the rear foot preferably lifts the seat cushion at the rear end by means of the backrest. By means of a lock or the like, which preferably is also used for fastening the rear foot to the base in the position of use, the rear foot is preferably locked to the front foot for securing.

The articulated connection provided by a plurality of articulated joints between the rear foot and base, preferably by forming a four bar linkage, in contrast to a direct linking of the rear foot to the base permits an improved utilization of the pivoting angle range with shorter pivoting arms.

As the base preferably has at least one seat rail pair, the longitudinal seat position may be adjusted in a finely stepped manner, possibly almost steplessly adjusted. In this connection, conventional seat rail pairs may be used, in which, for example, the two seat rails profiled in a substantially U-shaped manner mutually engage behind one another with their longitudinal edges bent to the inside and/or to the outside. By the use of such mass-produced products, the production costs of the vehicle seat may be reduced. For linking the feet to these conventional seat rail pairs, in the second seat rail—not connected to the vehicle structure—one respective receiver is configured, into which the associated foot is partially introduced. The receiver may be formed in a structurally simple manner, by a recess in the upper side of the second seat rail as an opening of the receiver and by an angle plate arranged within the second seat rail, which together with the side walls of the second seat rail forms the walls of the receiver. The receiver may be formed without an angle plate. To avoid noise generation when inserting the foot into the receiver, a rubber pad may be provided in the receiver or at a further suitable point.

Preferably on each receiver, preferably above the receiver, a locking pin is provided by which a lock or a further locking mechanism of the associated foot may be locked. The locking pin may be arranged at a very low level, whereby the rail height remains low. The locking pin is preferably connected to the second seat rail, as it comprises one or two arms extending in the longitudinal direction, which are connected to a retaining clamp, which in turn is attached to the second seat rail and by means of a recess allows access to the receiver. Alternatively, the locking pin only comprises the portion arranged transversely to the longitudinal direction and is respectively connected on the front face to the side walls or other regions of the second seat rail.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view of the motor vehicle seat embodiment in a position of use, shown partially in section;

FIG. 2 is a partial side view of the motor vehicle seat of FIG. 1 shown without the base, seat cushion and backrest;

FIG. 3 is a side view of the motor vehicle seat embodiment corresponding to FIG. 1 in the boarding position; and FIG. 4 is a side view of the motor vehicle seat embodiment corresponding to FIG. 1 in the flat-floor position.

DESCRIPTION OF THE PREFERRED EMBODIMENTS

Referring to the drawings in particular, a vehicle seat 1 which, for example, is provided as an outer seat of a central or rear row of seats of a motor vehicle, for example a van, has a seat cushion 3 and a backrest 5. In the following directional information it is assumed that the vehicle seat 1 is arranged in the motor vehicle in the forward direction of travel, in a position of use of the vehicle seat 1 suitable for conveying passengers, the backrest 5 being located at the rear end of the seat cushion 3. The backrest 5 in the present case is able to be adjusted in its inclination by means of fittings 7, of which one is provided on each respective vehicle seat side, so that a plurality of positions of use are defined. By the term "seat cushion" 3 is intended to be understood the entire sub-assembly, consisting of a structure, in the present case a seat cushion carrier 3a, and a covered cushion. Insofar as components are linked to the seat cushion 3, a link to the structure of the seat cushion 3 is to be understood thereby. The same applies to the backrest 5. The basic principles of the construction of the structure of the vehicle seat 1 have already been disclosed in WO 02/22391 A1, the relevant disclosure thereof being expressly included. Further, corresponding U.S. Pat. No. 6,655,738 is hereby incorporated by reference in its entirety. The fittings 7 are configured as latching fittings, the internal construction thereof being disclosed in WO 00/44582 A1 and the external construction thereof being disclosed in U.S. Pat. No. 6,799,806 B2. The relevant disclosure of both publications is expressly included (U.S. Pat. No. 6,799,806 B2 is hereby incorporated by reference in its entirety).

For the sake of simplicity, only the left-hand vehicle seat side of the substantially symmetrical vehicle seat 1 is disclosed hereinafter, i.e. the components cited hereinafter are, if not described differently, present twice (possibly mirror-symmetrically). Initially, the vehicle seat 1 is disclosed in a specific position of use, namely the design position, in which the backrest 5 is inclined to the rear by, for example, 23° relative to the vertical. A base 9 of the vehicle seat 1 is connected to the structure of the motor vehicle.

In the embodiment, the base 9 is configured as a seat rail arrangement, which offers the possibility of a longitudinal adjustment of the vehicle seat 1, but alternatively may be configured as a single component connected fixedly to the vehicle structure or may be the vehicle structure itself. The different variants of the base 9 may also be combined to form a modular system. The base 9 in the present case has a first seat rail 9a connected directly to the vehicle structure, and a second seat rail 9b displaceable relative to the first seat rail in the longitudinal direction. The two seat rails 9a and 9b of substantially U-shaped profile mutually engage behind one another with their longitudinal edges bent inward and/or outward and may be locked to one another—by means of a rail locking system known per se.

A front foot 11 is attached to the base 9, and namely in the present case connected fixedly to the second seat rail 9b. The front foot 11 could, however, also be releasably locked to the base 9. The seat cushion 3 is articulated to the front foot 11 by means of a rocker 13, the rocker 13 being provided at both ends with articulated joints, of which one forms the link to the front foot 11 and the other forms the link to the front end of the seat cushion 3.

In the direction of travel behind the front foot 11, a rear foot 21 is also arranged on the base 9 configured separately from the front foot 11, which by means of a lock 23 attached to the rear foot 21 is releasably locked to the base 9, more specifically locked to a counter element fixed to the base, for example a bolt in the second seat rail 9b, and thus is indirectly connected to the vehicle structure.

Additionally, the rear foot 21 is linked by means of a rear foot-four bar linkage 26 to the front foot 11, the four gear elements of the rear foot-four bar linkage 26 comprising a first link 27 and a second link 29 arranged behind the first link 27 in the direction of travel, which respectively comprise articulated joints at both ends. Thus the rear foot 21 is connected in an articulated manner to the base 9 by means of the links 27 and 29. In the positions of use, the rear foot-four bar linkage 26 is held locked by means of the lock 23. A first fitting part of the fitting 7 is also attached to the rear foot 21, whilst a second fitting part of the fitting 7 which may be pivoted relative to the first fitting part about the backrest pivot axis 33 and which may be locked thereto is fastened to the backrest 5. The backrest 5 is thus able to be adjusted in its inclination relative to the rear foot 21 by means of the fitting 7. The backrest pivot axis 33 extends horizontally between both vehicle seat sides and in a physical embodiment may be used as a transmission rod between the fittings 7 present on both sides.

The seat cushion 3 is directly linked on both sides by means of just one articulated joint 35 to the backrest 5. To this end, the frame-shaped seat cushion carrier 3a, more specifically the two side parts thereof, is(are) provided to the rear in the direction of travel with an arm 3b, which in the present case is formed on the seat cushion carrier 3a, i.e. (already during manufacture) being configured integrally therewith, and which protrudes obliquely upward (and to the rear). The angle enclosed by the seat cushion carrier 3a and arm 3b is approximately 130°±15°. The articulated joint 35 is arranged at the (free) end of the arm 3b. Thus the arm 3b and the articulated joint 35 couple the seat cushion carrier 3a (and thus the movement thereof) to the backrest 5 (and thus to the movement thereof). The articulated joint 35 is arranged offset to the backrest pivot axis 33 and has a pivot axis parallel to the backrest pivot axis 33. In the design position, the articulated joint 35 is located above, and in the direction of travel to the rear of, the backrest pivot axis 33. The two articulated joints of the rocker 13, the fitting 7 comprising the backrest pivot axis 33 and the articulated joint 35 form a further four bar linkage, denoted hereinafter as the cushion-four bar linkage 36. In the positions of use, the cushion-four bar linkage 36 is held locked by the fitting 7.

During the adjustment of the inclination of the backrest 5, the fitting 7 is unlocked on each vehicle seat side, the backrest 5 pivoted about the backrest pivot axis 33 into the desired position, the cushion-four bar linkage 36 also moving and then each fitting 7 again being locked. The movement of the cushion-four bar linkage 36 slightly alters the inclination of the seat cushion 3. The backrest 5 may also be pivoted flat to the rear, so that the vehicle seat 1 adopts a reclined position.

For transferring the vehicle seat 1 into a boarding position, as a featured position of non-use, the lock 23 is unlocked. The rear foot 21 is now shifted to the front by means of the rear foot-four bar linkage 26, i.e. the links 27 and 29, i.e. by the superimposition of a plurality of pivoting movements the rear foot 21 is moved upward and to the front relative to the base 9, whereby it is lifted away from the base 9. The fitting 7 remains in each case locked. As a result, the backrest 5 is in a rigid arrangement relative to the rear foot 21, but pivots as a whole to the front. The rocker 13 pivoting to the front lowers the front end of the seat cushion 3, whilst the shifting movement of the rear foot 21 lifts the rear end of the seat cushion 3.

When the boarding position is reached, in which the access to a rear row of seats is facilitated, optionally the lock 23 or a further locking device may be locked to the front foot 11, i.e. the rear foot 21 and the front foot 11 are preferably locked together. The return to the previously adopted position of use takes place after releasing the aforesaid locking between the feet 11 and 21 in the reverse sequence of the disclosed steps.

By a comparison between the position of use and the boarding position, a notional pivot point for the rear foot-four bar linkage 26 may be defined, i.e. if the rear foot 21 were to be linked to the notional pivot point on the base 9 or the vehicle structure, a pivoting movement of the vehicle seat 1 about the notional pivot point would have the same initial position and end position. In the solution according to the invention, however, the notional pivot point is located clearly below the base 9, and may therefore not be implemented. With a direct linking of the rear foot 21 to the base 9, the desired boarding space (equal to the size of accessible space behind the rear seat 1) would not be able to be achieved. Thus with the rear foot-four bar linkage 26 there is an improved utilization of the pivoting angle range with shorter pivot arms.

Optionally, during the transfer from the position of use into the boarding position the locking of the seat rails 9a and 9b is unlocked, so that the second seat rail 9b may be moved to the front, which increases the space behind the vehicle seat 1, i.e. the boarding space, and additionally facilitates the access. An unlocking of the seat rails 9a and 9b in a forcibly guided manner is preferred, for example by one of the links 27 and 29 actuating the unlocking during pivoting. Alternatively, a further sequence is also possible.

For transferring the vehicle seat 1 into a flat-floor position, as a further featured position of non-use, in which increased loading space is available, the backrest 5 is folded forward after unlocking the fitting 7. As is the case during the inclination adjustment, the cushion-four bar linkage 40 moves. By moving the rocker 13 to the front, the cushion-four bar linkage 40 and thus the seat cushion 3 start to be lowered. When approaching the flat-floor position, in which the rear side of the backrest 5 is at least approximately located in the horizontal, the backrest 5 lies on the seat cushion 3. The securing of this folded-down flat-floor position takes place by locking the fitting 7. The return into the previously adopted position of use takes place after unlocking the fitting 7 in the reverse sequence of the disclosed steps.

While specific embodiments of the invention have been described in detail to illustrate the application of the principles of the invention, it will be understood that the invention may be embodied otherwise without departing from such principles.

APPENDIX

List of Reference Numerals
1 Vehicle seat
3 Seat cushion
3a Seat cushion carrier
3b Arm
5 Backrest
7 Fitting
9 Base
9a First seat rail
9b Second seat rail
11 Front foot
13 Rocker
21 Rear foot
23 Lock
26 Rear foot-four bar linkage
27 First link
29 Second link
33 Backrest pivot axis
35 Articulated joint
36 Cushion-four bar linkage

What is claimed is:

1. A vehicle seat, which may be transferred from at least one position of use suitable for conveying passengers into at least one pivoted-forward position of non-use, the vehicle seat comprising:
   a base;
   a front foot attached to said base;
   at least one rocker linked to said front foot;
   a seat cushion linked to said rocker;
   a link linked to said front foot;
   a rear foot linked to said link and is releasably locked to said base;
   a backrest pivotably linked to said rear foot about a backrest pivot axis; and
   an articulated joint, said seat cushion being linked directly to said backrest by said articulated joint, said articulated joint having only one single-axis articulated connection, wherein a structure of said seat cushion includes a seat cushion carrier comprising a seat cushion carrier portion and an arm, said arm protruding to a rear of the vehicle seat, said articulated joint being arranged at an end of said arm, said arm being rigidly connected to said seat cushion carrier portion, said arm being directly connected to said backrest, said arm being arranged at an angle with respect to said seat cushion carrier portion, said seat cushion carrier portion being directly connected to said seat cushion.

2. The vehicle seat as claimed in claim 1, further comprising another articulated joint wherein said seat cushion is linked on one of two sides of the vehicle seat to said backrest by means of only said articulated joint and said seat cushion is linked on another of two sides of the vehicle seat to said backrest by means of only the said another articulated joint.

3. The vehicle seat as claimed in claim 1, wherein said articulated joint is arranged offset to the backrest pivot axis with the pivot axis parallel thereto.

4. The vehicle seat as claimed in claim 1, further comprising:
   a lockable fitting wherein said backrest is linked by said lockable fitting to said rear foot and said backrest is adjustable in inclination relative to said rear foot.

5. The vehicle seat as claimed in claim 4, wherein said lockable fitting defines said backrest pivot axis, said articulated joint and said rocker define a four bar linkage for lowering said seat cushion upon said lockable fitting being unlocked.

6. The vehicle seat as claimed in claim 1, wherein the vehicle seat transitions into a flat-floor position as a position of non-use and during transitioning into said flat-floor position as a position of non-use, said backrest is pivoted forwards and the seat cushion is lowered.

7. The vehicle seat as claimed in claim 1, wherein the vehicle seat transitions into a boarding position as a position of non-use wherein during the transition of the vehicle seat into said boarding position said rear foot is unlocked and lifted away from said base by said link while said backrest is pivoted forwards, maintaining an inclination relative to said rear foot.

8. The vehicle seat as claimed in claim 7, wherein said rear foot is connected to said base in an articulated manner by means of a four bar linkage comprising said link and another link and wherein during a transition into said boarding position the four bar linkage shifts the rear foot toward the front.

9. The vehicle seat as claimed in claim 7, wherein during the transition into said boarding position, said rocker pivots to the front and the front end of the seat cushion is lowered.

10. The vehicle seat as claimed in claim 7, wherein, during the transition into the boarding position, said rear foot is lifted away from the base and lifts a rear end of said seat cushion.

11. The vehicle seat as claimed in claim 1, wherein said base has at least one first seat rail connected to the vehicle structure, and a second seat rail displaceable relative to the first seat rail in the longitudinal direction and lockable thereto.

12. The vehicle seat as claimed in claim 11, wherein during the transition into the boarding position, said second seat rail is unlocked in a forcibly guided manner, and pushed toward the front.

13. The vehicle seat as claimed in claim 11, wherein one or more of said front foot and said rear foot are releasably locked to said second seat rail.

14. A motor vehicle seat comprising:
a base;
a front foot attached to said base;
at least one rocker pivotally connected to said front foot;
a seat cushion pivotally connected to said rocker;
a link pivotally connected to said front foot;
a rear foot pivotally connected to said link and releasably locked to said base;
a backrest connected to said rear foot pivotably about a backrest pivot axis;
a seat cushion carrier having a fixed connection to said seat cushion and defining one articulation between said backrest and said seat cushion and having a rigid extent between said one articulation and said fixed connection, whereby the motor vehicle seat may be transferred from at least one position of use suitable for conveying passengers into at least one pivoted-forward position of non-use; and
another articulation, wherein said seat cushion is linked on one of two sides of the vehicle seat to said backrest by means of only said one articulation and said seat cushion is linked on another of two sides of the vehicle seat to said backrest by means of only said another articulation, said one articulation being arranged offset to the backrest pivot axis with the pivot axis parallel thereto, said seat cushion carrier comprising a seat cushion carrier portion and a seat cushion carrier arm portion, said seat cushion carrier portion being directly connected to said seat cushion, said seat cushion carrier arm portion being at an angle relative to said seat cushion carrier portion, said seat cushion carrier arm portion being rigidly connected to said seat cushion carrier portion, said seat cushion carrier arm portion extending to a rear of the vehicle seat, said one articulation being formed at an end of said seat cushion carrier arm portion, said seat cushion carrier arm portion being directly connected to said backrest.

15. The motor vehicle seat as claimed in claim 14, further comprising:
a lockable fitting wherein said backrest is linked by said lockable fitting to said rear foot and said backrest is adjustable in inclination relative to said rear foot.

16. The motor vehicle seat as claimed in claim 15, wherein said lockable fitting defines said backrest pivot axis, each said articulation and said rocker define a four bar linkage for lowering said seat cushion upon said lockable fitting being unlocked.

17. The motor vehicle seat as claimed in claim 16, wherein:
the vehicle seat transitions into a flat-floor position as a second position of non-use and during transitioning into said flat-floor position as said second position of non-use, said backrest is pivoted forwards and the seat cushion is lowered; and
the vehicle seat transitions into a boarding position as said at least one pivoted-forward position of non-use, wherein during the transition of the vehicle seat into said boarding position said rear foot is unlocked and lifted away from said base by said link while said backrest is pivoted forwards, maintaining an inclination relative to said rear foot.

18. A vehicle seat, which may be transferred from at least one position of use suitable for conveying passengers into at least one pivoted-forward position of non-use, the vehicle seat comprising:
a base;
at least one rocker, which is at least indirectly linked to the base;
a seat cushion linked to the rocker and comprising as a structure a seat cushion carrier;
an arm rigidly protruding from a rear side of the seat cushion carrier, wherein an articulated joint is attached to an end of the arm, said arm being fixed relative to said seat cushion, wherein said arm does not move relative to said seat cushion;
at least one link at least indirectly linked to the base;
at least one rear foot linked to the link and releasably locked to the base; and
a backrest pivotably linked to the rear foot about a backrest pivot axis by means of at least one lockable fitting, the backrest being adjustable in inclination relative to the rear foot, the seat cushion carrier being directly connected to the backrest by means of the articulated joint, which has a pivot axis arranged in parallel to and offset from the backrest pivot axis, wherein when the vehicle seat transfers into a boarding position of non-use the rear foot unlocks and shifts away from the base by means of the link thereby lifting the rear end of the seat cushion while the backrest is pivoted forwards, maintaining inclination of said backrest relative to the rear foot, wherein the rocker pivots to the front and the front end of the seat cushion is lowered.

19. A vehicle seat in accordance with claim 1, wherein said at least one rocker is at least indirectly linked to a front foot attached to the base, said at least one link being at least indirectly linked to the front foot attached to the base.

* * * * *